United States Patent [19]

Ferrell

[11] 4,144,558

[45] Mar. 13, 1979

[54] COMBINED TRIM RING AND SUPPORT FOR HEADLIGHTS

[76] Inventor: James E. Ferrell, 1005 Parkside, Lot 29, Peoria, Ill. 61614

[21] Appl. No.: 809,064

[22] Filed: Jun. 22, 1977

[51] Int. Cl.² .............................................. F21M 3/14
[52] U.S. Cl. .................................... 362/255; 362/306; 362/365
[58] Field of Search ............... 362/215, 255, 306, 328, 362/329, 336, 337, 365, 366, 374, 61, 83, 64

[56] References Cited

U.S. PATENT DOCUMENTS

| | | | |
|---|---|---|---|
| 2,281,643 | 5/1942 | Wahlberg | 362/83 |
| 2,596,879 | 5/1952 | Warren et al. | 362/255 X |
| 3,110,883 | 11/1963 | Nallinger et al. | 362/64 X |
| 3,387,127 | 6/1968 | Ericks | 362/61 X |
| 3,405,898 | 10/1968 | Ringle | 362/61 X |
| 3,514,589 | 5/1970 | Huber | 362/64 X |

Primary Examiner—Peter A. Nelson
Attorney, Agent, or Firm—Ralph F. Staubly

[57] ABSTRACT

A combined trim ring and support plate for a single or a pair or set of contiguous vehicle head, tail, or other lights comprises an ornamental plate having one or more cut-out areas defining apertures of sizes to expose therein one or more (sealed-beam) headlights or equivalent units. The margins of the plate overlap the margins of an aperture in a vehicle-body shell member (such as a fender or a truck front or rear panel) and is fastened to the shell member by self-tapping screws (or bolts) passing through aligned holes in the plate and the shell member. The plate margin preferably has a narrow rearwardly turned flange whose edge is embraced by a rubber-like cushioning and water-excluding channel ring. The plate and the light (or its jacket) are provided with co-operating elements interconnected by machine screws which serve to mount the light on the rear face of the plate and some of which are tool-engageable from the front of the plate through small holes to serve also for beam adjustment if the lights are headlights. A specially constructed pair of interconnected electrical adaptor plugs are provided for connecting a pair of up-down-beam headlights to eliminate the need to cut or splice conventional connectors now used with such conventional units.

4 Claims, 4 Drawing Figures

U.S. Patent        Mar. 13, 1979        4,144,558
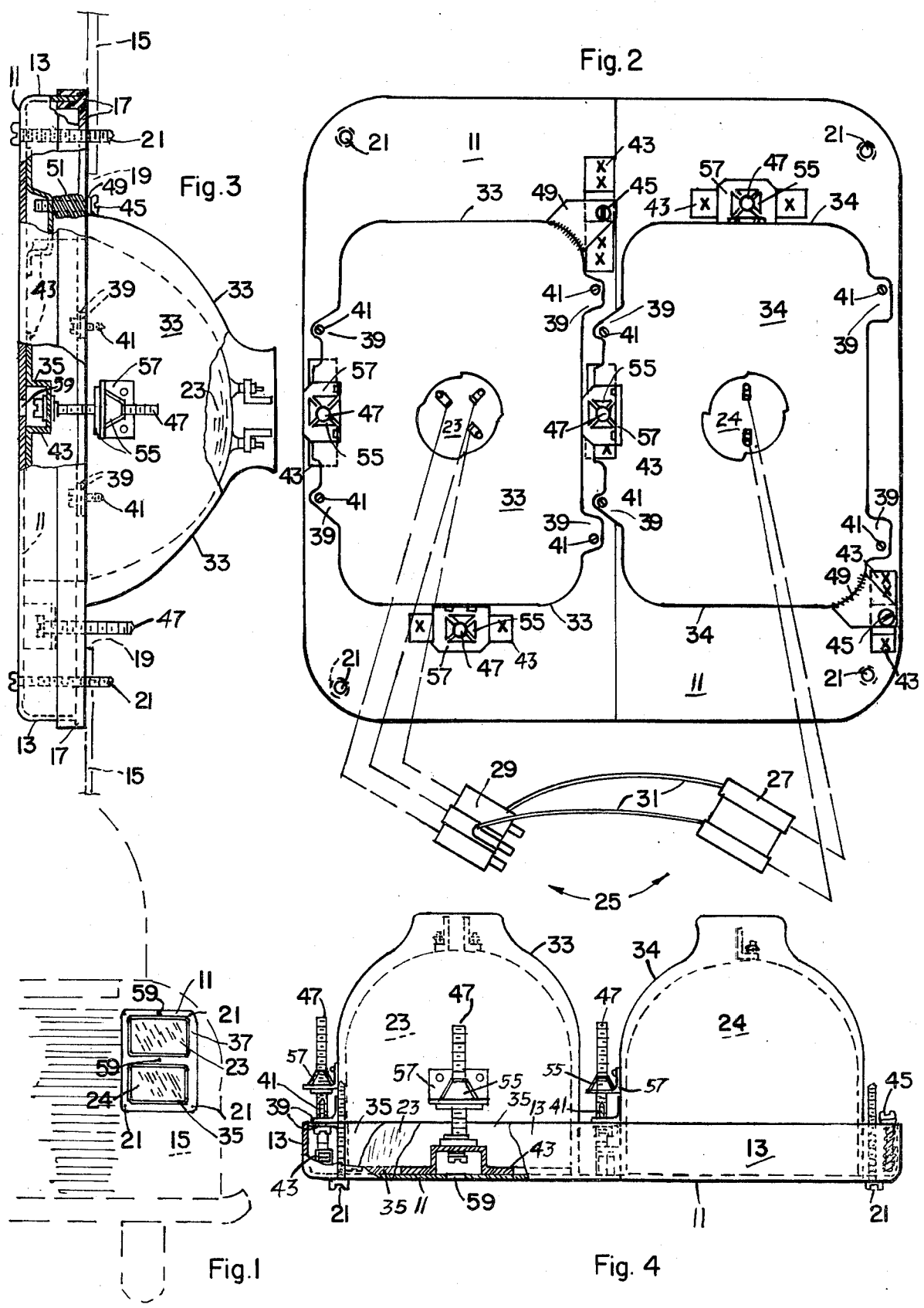

COMBINED TRIM RING AND SUPPORT FOR HEADLIGHTS

BACKGROUND AND OBJECTS OF THE INVENTION

Conventional headlight or similar installations consist of separate structures. The support structures are attached to vehicle parts within the body shell but not directly connected to or carried thereby, which support structures are positioned to mount the light units in openings formed in the shell. Separate ornamental frame structures are then required to cover the gaps between the margins of the light units and the margins of their shell openings. Each assemblage is thus structurally complicated and difficult to install or repair. And headlight adjustment requires removal of the trim frame structures.

It is accordingly the principal object of this invention to simplify headlight or like installations by providing a combined support and trim ring therefor, which is easily installed in and supported by the margins of shell openings for the installations.

It is another object to provide a combined trim ring and support plate for a headlight installation in which the headlight can be beam-adjusted by a slender rod-like tool insertable through the support plate without disturbing the ring or the plate.

It is further object to provide a pair of interconnected adaptor plugs whereby a pair of high-low-beam lights can be installed without cutting or splicing conventional connector units for single high-low-beam lights.

Other objects and advantages of the disclosure will appear as the following detailed description proceeds.

SHORT DESCRIPTION OF THE DRAWINGS

FIG. 1 is a front view of a one-over-one headlights embodiment of the invention typically installed.

FIG. 2 is a rear elevational view of a side-by-side headlights embodiment.

FIG. 3 is a side view, from the left, of FIG. 2.

FIG. 4 is a plan view, from below, of the disclosure of FIG. 2 minus the electrical connector subcombination.

DETAILED DESCRIPTION

With reference now to the drawings, the numeral 11 designates the combined trim ring and support plate (hereinafter called the support plate). Said plate has a rearwardly turned peripheral flange 13 of varying width if and as needed to fit the contour of the body shell 15 (FIG. 3). The edge of the flange 13 is capped by a finish-protecting and weather-proofing resilient rubber or plastic channel element 17 (shown only in FIG. 3 but omitted elsewhere for clarity). The support plate 11 is fastened to the somewhat overlapped margins of the assemblage-receiving aperture 19 (FIG. 3) in the body shell 15 by four self-tapping screws 21.

The support plate has mounted thereon a pair of conventional sealed-beam lamps 23 and 24. Lamp 23 has two filaments and three terminals for high or low beam, while lamp 24 has a single filament for high beam only (FIG. 2), which can be connected to a conventional three-wire connector (not shown) for a single two-filament headlight by the adaptor 25. The adaptor 25 comprises a two-terminal female coupler 27 and a three-terminal male-to-female coupler 29, which couplers are interconnected by short flexible leads 31. The male terminals of the coupler 29 connect with the terminals of said conventional connector.

The lamps 23 and 24 are housed in metallic shells 33 and 34, respectively, and are retained therein by sheet-metal rings 35 having inturned flanges 37 embracing the margins of the lamp faces. The shells and the rings have mating outturned integral tabs 39 (FIGS. 3 and 4) interconnected by self-tapping screws 41 to form a lamp-embracing housing.

The shells 33 and 34, and thereby the lamps 23 and 24, are each beam-adjustably supported in shape-conforming cutout areas in the support plate 11 by a three-point suspension arrangement. Each suspension arrangement comprises three omega-shaped straps 43 spot-welded to the support plate 11 with its bight portion spaced from the support plate and apertured to receive an anchoring screw 45 in one aperture and two beam-adjusting screws 47 in the other two apertured straps.

The screws 45 also pass through apertures in tabs 49 welded to the shells 33 and 34. Coil springs 51 co-operate with the screws 45 to permit in-out positioning and beam-angle adjustments of the lamps. The screws 47 have enlarged heads 53 circumferentially grooved to engage over the edge of laterally open slots in their co-operating straps 43. The screws 47 also pass through plastic split nuts 55 which are fixed to the shells 33 and 34 by being press-fitted into apertures in angle brackets 57 riveted or welded to the shells 33 and 34. The heads of the screws 47 are kerfed to receive a screw-driver-like adjusting rod (not shown) inserted through small holes 59 (FIG. 4) in the support plate 11 axially aligned with the screws 47.

The invention having thus been described what is claimed as being new and patentable is:

1. A combined support plate and trim ring for mounting at least one headlight unit in an aperture in the body shell of a vehicle, comprising: a plate having at least one open area of headlight-face-area size, an open-faced metallic shell for protectively covering the rear surface of a standardized parabolic-reflector-type sealed-beam headlight lamp, said metallic shell having a rearwardly flanged central opening of a size and shape to protectively surround the rearwardly projecting terminals of said lamp when installed in said shell, a flanged lamp-retainer ring adapted to embrace the margin of the face of said lamp, peripherally spaced interconnecting means for pulling said ring and said shell together to clamp said lamp firmly in said shell to form therewith a headlight unit, means for fastening said headlight unit to said plate in said open area, said plate being of a size to overlap the face margins of said body-shell aperture, and quickly attachable and detachable means for interconnecting the overlapping portions of said body shell and said plate.

2. Structure according to claim 1, said headlight-unit being of the adjustable-beam type and including means engageable by a rod-type tool for adjusting its beam-directing orientation, said plate having small holes therein to receive said rod-type tool therethrough for the adjusting operation.

3. Structure according to claim 1 and additionally including another headlight-unit in an adjacent open area in said plate, said units constituting a pair of high-low-beam conventional headlights of which one has a single filament and the other has two different-beam-angling filaments, and an adaptor interconnecting said headlight-units, said adaptor comprising a pair of flexible-lead-connected plugs of which one plug has two female terminals for connection to the single-filament headlight-unit, and the other plug has three double-ended female-to-male terminals for connection to the two-filament headlight-unit and also to the plug of a conventional three-wire headlight extension cord without requiring cutting or splicing of said extension cord.

4. Structure according to claim 1, said plate having a rearwardly turned flange of a variable width to conform to the contour of the body shell adjacent said aperture.

* * * * *